(12) United States Patent
Beach et al.

(10) Patent No.: US 7,437,916 B2
(45) Date of Patent: Oct. 21, 2008

(54) IN CHASSIS DETERMINATION OF LUG CURVE DATA IN A MACHINE WITH AN ELECTRIC DRIVE PROPULSION SYSTEM

(75) Inventors: Frederick Beach, E. Peoria, IL (US); Jun Dou, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 114 days.

(21) Appl. No.: 11/640,638

(22) Filed: Dec. 18, 2006

(65) Prior Publication Data

US 2008/0147258 A1  Jun. 19, 2008

(51) Int. Cl.
G01M 15/00 (2006.01)
(52) U.S. Cl. .................................. 73/114.14
(58) Field of Classification Search ............ 73/114.13, 73/114.14, 114.15
See application file for complete search history.

(56) References Cited

U.S. PATENT DOCUMENTS

| 4,501,138 | A | * | 2/1985 | McCandless | ............ 73/114.15 |
| 4,557,140 | A | * | 12/1985 | McFarland | ............... 73/114.14 |
| 5,070,959 | A | | 12/1991 | Grabowski | |
| 5,280,223 | A | | 1/1994 | Grabowski et al. | |
| 5,373,219 | A | | 12/1994 | Grabowski et al. | |
| 5,432,413 | A | | 7/1995 | Duke et al. | |
| 5,559,704 | A | * | 9/1996 | Vanek et al. | ................ 701/99 |
| 5,939,846 | A | | 8/1999 | Young et al. | |
| 6,041,285 | A | | 3/2000 | Young et al. | |
| 6,054,829 | A | | 4/2000 | Young et al. | |
| 6,150,780 | A | | 11/2000 | Young et al. | |
| 6,339,742 | B2 | | 1/2002 | Weisman, II | |
| 7,340,339 | B1 | * | 3/2008 | Fabry et al. | ............... 701/104 |
| 2006/0266255 | A1 | | 11/2006 | Donnelly et al. | |

FOREIGN PATENT DOCUMENTS

| EP | 1 707 417 | 10/2006 |
| WO | WO 99/04485 | 1/1999 |
| WO | WO 2006/085193 | 8/2006 |

* cited by examiner

Primary Examiner—Eric S McCall
(74) Attorney, Agent, or Firm—Liell & McNeil (57) ABSTRACT

A machine includes an electric drive propulsion system including an internal combustion engine, an alternator, a motor controller, and at least one electric motor. The machine further includes an electronic controller in communication with the electric drive propulsion system. The electronic controller is configured to determine, in chassis, and store a lugging horsepower of the engine at a plurality of different engine speeds. The machine further includes a memory for storing the lugging horsepower for each of the plurality of different engine speeds corresponding to lug curve data. The electronic controller is further configured to affect a control decision based on the lug curve data.

19 Claims, 6 Drawing Sheets

IN CHASSIS DETERMINATION OF LUG CURVE DATA IN A MACHINE WITH AN ELECTRIC DRIVE PROPULSION SYSTEM

TECHNICAL FIELD

The present disclosure relates generally to determining engine lug curve data of a machine with an electric drive propulsion system, and more particularly to determining and storing a lugging horsepower of the engine at a plurality of different engine speeds, in chassis.

BACKGROUND

The mining industry relies heavily on off-road vehicles to perform a variety of tasks. Specifically, mining trucks are used to haul large amounts of extracted materials throughout a mining site. In the case of underground mining, the trucks are further required to haul the materials throughout tunnels and up various grades to resurface from the extraction site.

The engines of these mining trucks are typically diesel engines capable of producing a large amount of horsepower. Recently, there has been a trend to have the engine power transmitted to truck wheels through an electric drive propulsion system rather than a mechanical drive system. The electric drive propulsion system permits the engine to deliver power more efficiently. It typically consists of a generator or alternator and a wheel motor mounted for delivering torque rim pull to each drive wheel. The electric drive system may also include a throttle sensor that is used to determine an actuation of the throttle which, in turn, may be interpreted by a controller to determine the amount of horsepower or torque rim pull requested by the operator.

Although most manufacturers preclude the release of an engine that does not operate according to specific standards, a slight variation, due to inherent manufacturing constraints, will be allowed. Therefore, a nominal lug curve provided by the manufacturer may not accurately represent the actual operating conditions of similar engines. In addition, once an engine leaves the manufacturer, operating conditions may begin to deviate, possibly further, from those represented by the nominal lug curve. Natural changes, including normal wear of an engine, may contribute to changes in the operating conditions of an engine over time. If control decisions are made based upon nominal lug curve data, inaccuracies in the data can result in operation inefficiencies, which may include unnecessary fuel consumption.

Economic pressures render it is desirable to operate the engine at maximum fuel economy and engine efficiency. This includes operating the engine at the lowest engine speed required to produce the necessary rim pull or horsepower, and avoiding situations that cause the engine to lug. Lugging generally decreases fuel economy by consuming excess fuel without providing the requested rim pull or horsepower.

U.S. Pat. No. 5,939,846 discloses a machine with an electric drive propulsion system and method of determining the maximum horsepower available from the engine at a current operating speed based on an adjustment of the nominal lug curve provided by the manufacturer. Specifically, a regulator continuously adjusts a software variable reflecting an available horsepower limit until an engine reaches a desired operating condition that matches the torque demand. Since this disclosure does not account for deviations from the nominal lug curve, that may occur both when the engine is manufactured and as the engine ages, fuel may be wasted as the regulator continuously corrects the current available horsepower relative to that specified by the nominal lug curve to what the engine can actually deliver.

The present disclosure is directed to one or more of the problems set forth above.

SUMMARY OF THE INVENTION

In one aspect, a machine includes an electric drive propulsion system including an internal combustion engine, an alternator, a motor controller, and at least one electric motor. The machine further includes an electronic controller in communication with the electric drive propulsion system. The electronic controller is configured to determine, in chassis, and store a lugging horsepower of the engine at a plurality of different engine speeds. The machine further includes a memory for storing the lugging horsepower for each of the plurality of different engine speeds corresponding to lug curve data. The electronic controller is further configured to affect a control decision based on the lug curve data.

In another aspect, a method of operating a machine with an electric drive propulsion system having an internal combustion engine, an alternator, a motor controller, and at least one electric motor includes a step of determining a lugging horsepower of the engine at a plurality of different engine speeds. The method further includes steps of storing the lugging horsepower for each of the plurality of different engine speeds in a memory corresponding to lug curve data, and affecting a control decision based on the lug curve data.

DETAILED DESCRIPTION

Figure 1:
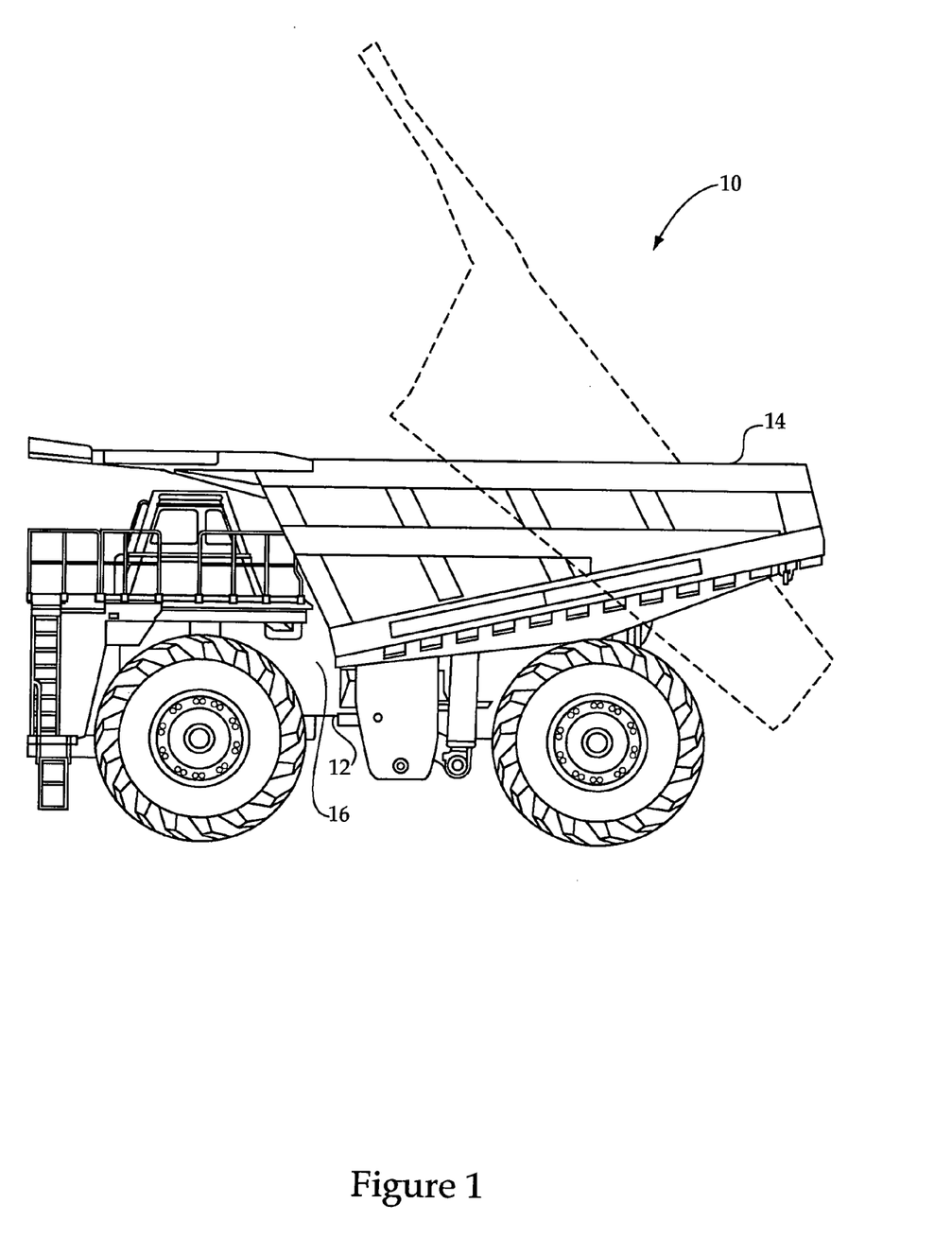
FIG. 1 is a side diagrammatic view of a machine having an electric drive propulsion system according to the present disclosure.

An exemplary embodiment of a machine 10 is shown generally in FIG. 1. The machine 10 may be a mining truck, as shown, or other vehicle, such as an off-highway truck or any other vehicle or machine that includes an electric drive propulsion system. In the illustrated embodiment, mining truck 10 includes a chassis 12, a drive system 16, and a dump body 14. The dump body 14 is pivotally mounted on the chassis 12 such that the dump body 14 is movable between a hauling position, as shown, and a dumping position, shown in phantom.

Figure 2:
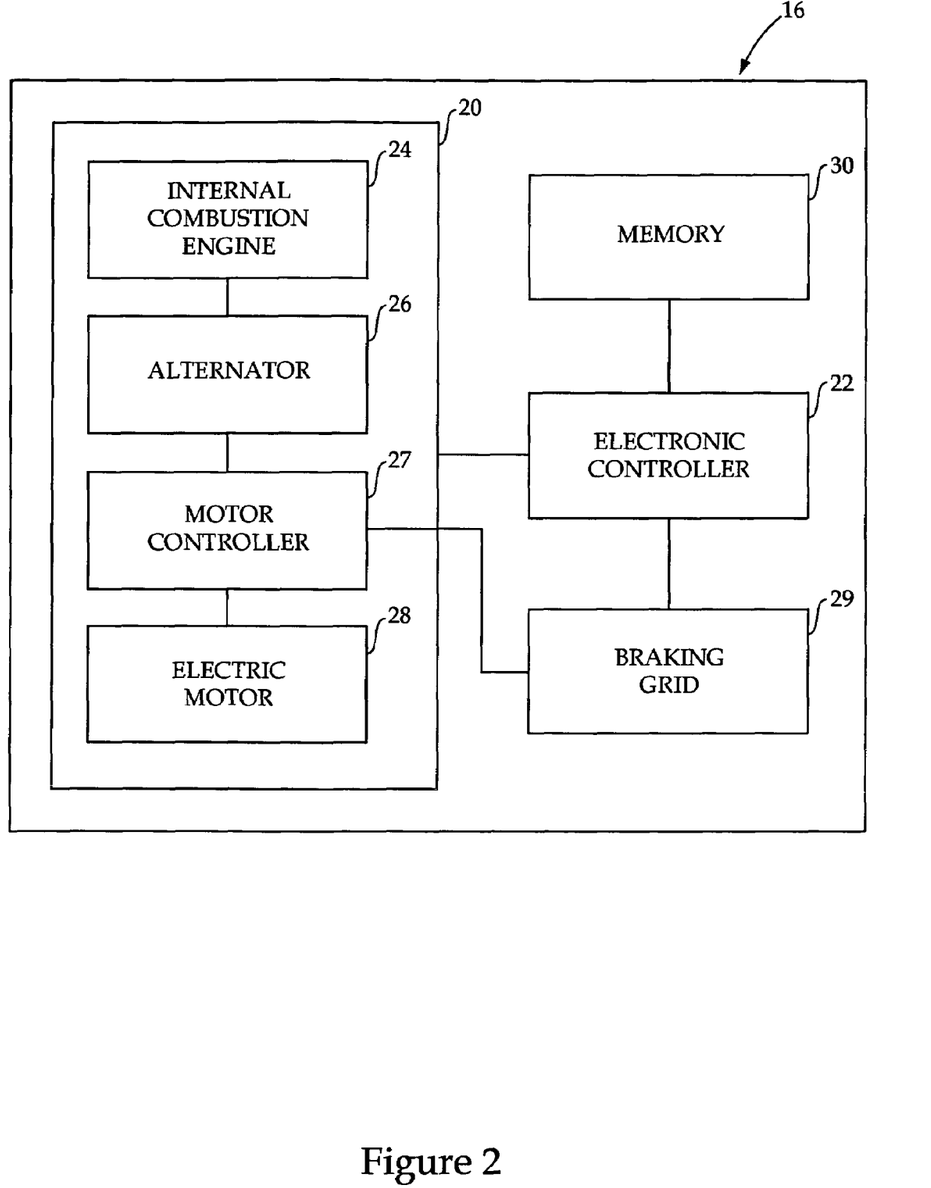
FIG. 2 is a block diagram of the electric drive propulsion system of FIG. 1 according to the present disclosure.

Referring to FIG. 2, the drive system 16 generally includes an electric drive propulsion system 20 and an electronic controller 22 in communication with the electric drive propulsion system 20. The electric drive propulsion system 20 includes an internal combustion engine 24, such as, for example, a compression or spark ignited engine, that provides mechanical power to an alternator or generator, such as, for example, alternator 26. The alternator 26, in turn, produces electrical power, such as, for example, an alternating electrical current for the motor controller 27. The motor controller 27 may also use one or more rectifiers, if desired, to convert the alternating electrical current to a direct electrical current. The motor controller 27 conditions the electrical power produced by the alternator 26 to provide a voltage and current sufficient to power one or more motors, such as, for example, electric motor 28. Electric motor 28 may be, for example, a wheel motor used to power a wheel that propels the mining truck 10. The motor controller 27 may, as directed by the electronic controller 22, direct the electrical power produced by the alternator 26, or the power produced by the one or more motors, such as, electric motor 28 to the braking grid 29. The braking grid 29 dissipates the electrical power into heat energy that is transferred into the atmosphere.

In its most basic version, the electronic controller 22 is of standard design and may include a processor, a memory, and an input/output circuit. The memory, which may or may not comprise a battery backed RAM, may include instructions for controlling operation of the electric drive propulsion system 20. The input/output circuit may receive and send communications to and from sensors and/or additional controllers and/or actuators throughout the mining truck 10, and the processor my carry out instructions initiated internally or externally of the electronic controller 22. The electronic controller 22 may also be in communication with a memory 30 that is incorporated into, or external to, the electronic controller 22. A computer read/write device, which can be part of controller 22, may also be employed to read data from and/or write data to the memory 30 in response to communications from the electronic controller 22.

Figure 3:
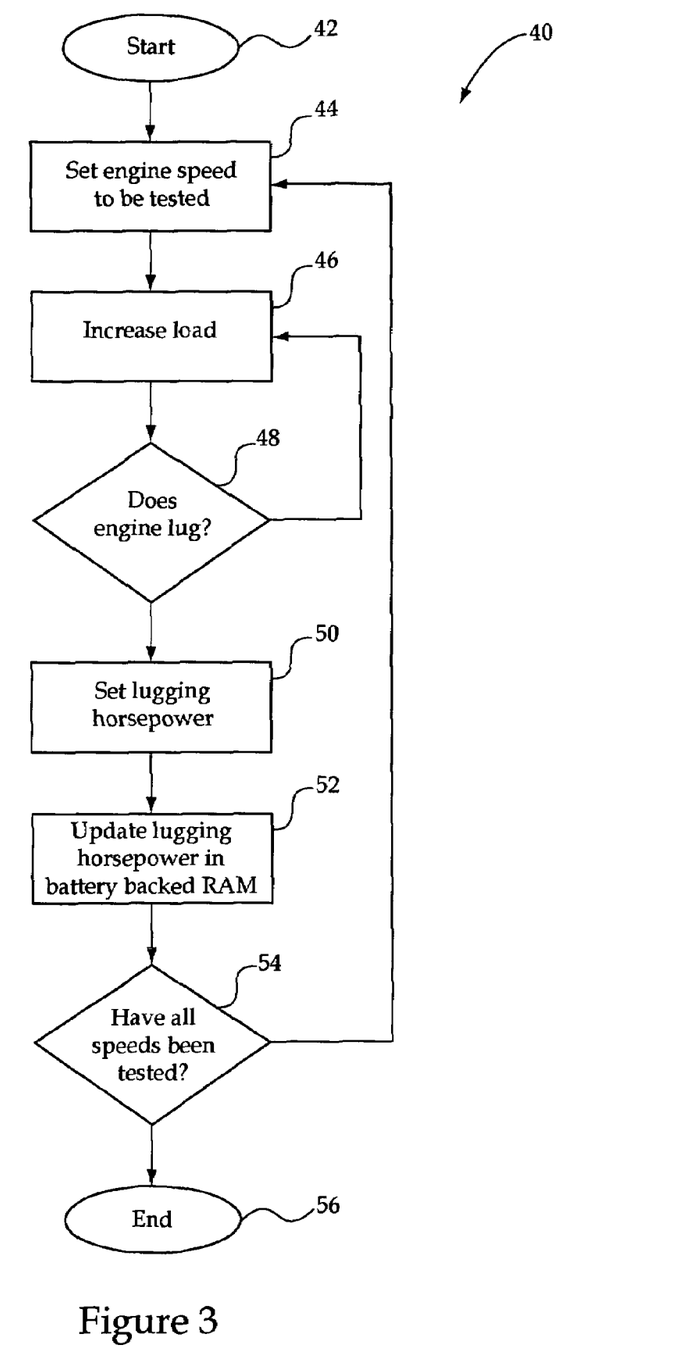
FIG. 3 is a flow chart of one embodiment of a method of determining a lugging horsepower of the engine at a plurality of different engine speeds according to the present disclosure.

Turning to FIG. 3, there is shown a flow chart 40 representing a method of determining a lugging horsepower of the engine 24 of mining truck 10 at a plurality of different engine speeds that correspond to different available horsepowers from the electric drive propulsion system 20 according to the present disclosure. The method 40 may be implemented, for example, using electronic controller 22 or other electronic circuits and systems known to those skilled in the art.

The method begins at a START, Box 42. From Box 42, the method may proceed to Box 44, which includes the step of setting a speed of the engine 24 to be tested. A load on the electric drive propulsion system 20 is then increased at Box 46. As an illustration, the load may be increased by sending a torque command to at least one electric motor of the electric drive propulsion system 20, such as, for example, the electric motor 28. Alternatively, the load may be increased by increasing a voltage across the braking grid 29 of the electric drive propulsion system 20. At Box 46, measures may be taken to disable one or more parasitic load devices that may draw power from the engine 24. Such parasitic load devices may include, but are not limited to, an air conditioning compressor or an engine cooling fan.

At Box 48 the method determines if the engine lugs. This may, for example, be detected by determining that the speed of the engine 24 has dropped a predetermined RPM value from the engine speed being tested, as set at Box 44. If the engine 24 satisfies the method's requirement for engine lugging the method advances to Box 50. If engine lugging has not been detected, the method returns to Box 46 where the load is further increased.

At Box 50, the lugging horsepower is set to a value corresponding to the current load on the electric drive propulsion system 22. Once the lugging horsepower value is set, the method proceeds to Box 52 where this lugging horsepower data is stored in a battery backed RAM, such as, for example, memory 30. However, one skilled in the art will appreciate that the lugging horsepower data may be stored in any form of electronic storage.

At Box 54 the method determines if all of the desired engine speeds have been tested. It may be desirable, for example, to test the entire speed range of the engine 24, such as in 50 RPM increments. It may be preferable, however, to test only the engine speeds within the higher load operating range of the truck 10, as values from the manufacturer provided nominal lug curve may be sufficiently accurate for lower operating speeds of the truck 10. More preferably, speed intervals, such as, for example, every 50 RPMs, within the higher load operating range may be tested. Once all of the desired engine speeds have been tested, the method may proceed to an END, Box 56. If further testing is required, however, the method returns to Box 44 for another engine speed to be tested using the steps described above.

The method of FIG. 3 may be executed when mining truck 10 is stationary. Alternatively, the method may be executed while mining truck 10 is in motion, using known techniques. For instance, the truck 10 may have some means for estimating propulsion system load in real time, or the testing may be performed under predetermined conditions, such as on a smooth known grade with a measured truck weight. In addition, the method may be initiated by an operator of the truck 10 at any desired frequency or may be automatically started by the electronic controller 22 on a monthly basis or during routine service intervals, or when other specified conditions have been met.

Figure 4:
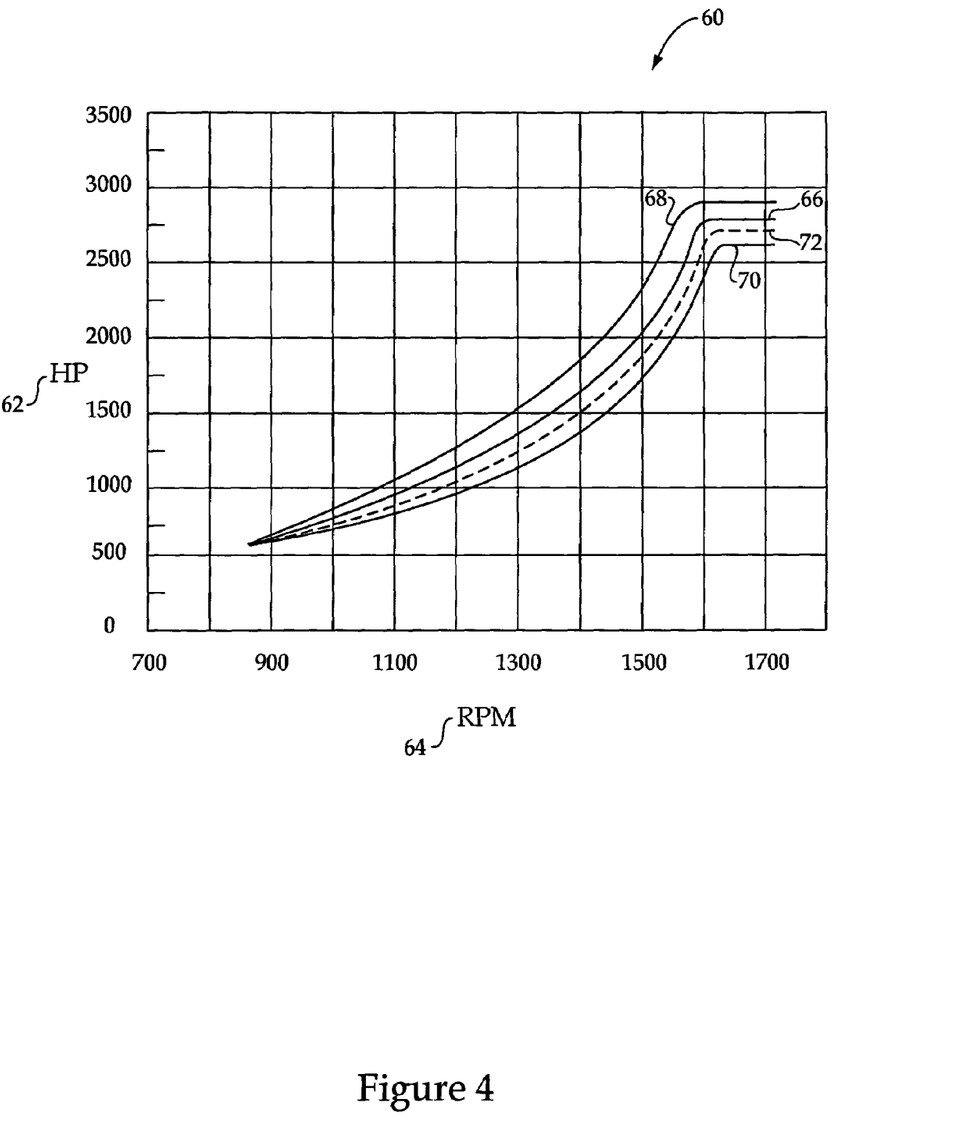
FIG. 4 is a graph of horsepower versus engine speed illustrating a nominal lug curve provided by a manufacturer, a variance about the nominal lug curve, and a specific lug curve determined according to the present disclosure.

FIG. 4 illustrates a graph 60 of horsepower 62, shown on the vertical axis, versus engine speed 64, shown on the horizontal axis. Depicted on the graph 60 is a nominal lug curve 66 that may be provided by a manufacturer. Since most engines, due to inherent manufacturing constraints are not going to operate according to the specified nominal curve 66, the manufacturer may allow the release of engines that operate within a band defined by an upper variance 68 and a lower variance 70 with respect to the nominal curve 66.

Also depicted on the graph 60 is an example lug curve 68, wherein the horsepower values of lug curve 68 represent lugging horsepower values at various engine speeds determined by the method of FIG. 3 for machine 10. As shown by the graph 60, the lug curve 68 may differ from the nominal lug curve 66 provided by the manufacturer and should, but may not, lie within the band defined by the upper variance 68 and the lower variance 70.

The lug curve 68, determined by the method of FIG. 3 and illustrated in FIG. 4 may be stored in a memory of the electronic controller 22 or, alternatively, may be stored in the memory 30 external to the electronic controller 22. For instance, the lug curve data may be stored and updated in battery backed RAM memory. In yet another alternative, the lugging horsepower may be stored at a location remote to the mining truck 10 accessed by the electronic controller 22 via telemetry or other known techniques. The memory, such as, for example, memory 30, may contain data representative of the lug curve 68, wherein a value representative of the lugging horsepower is mapped to a value representing engine speed. The lugging horsepower may replace a previous value stored in memory 30 for the engine speed, such as, for example, a value representative of a horsepower of nominal lug curve 66. Alternatively, values may be stored in memory 30 that may be manipulated by an equation to arrive at the lugging horsepower. Thus, lug curve data may be stored in any suitable manner including, but not limited to maps, tables, equation(s), neural networks, RAM memory, hard memory, embedded in control software code, etc.

Figure 5:
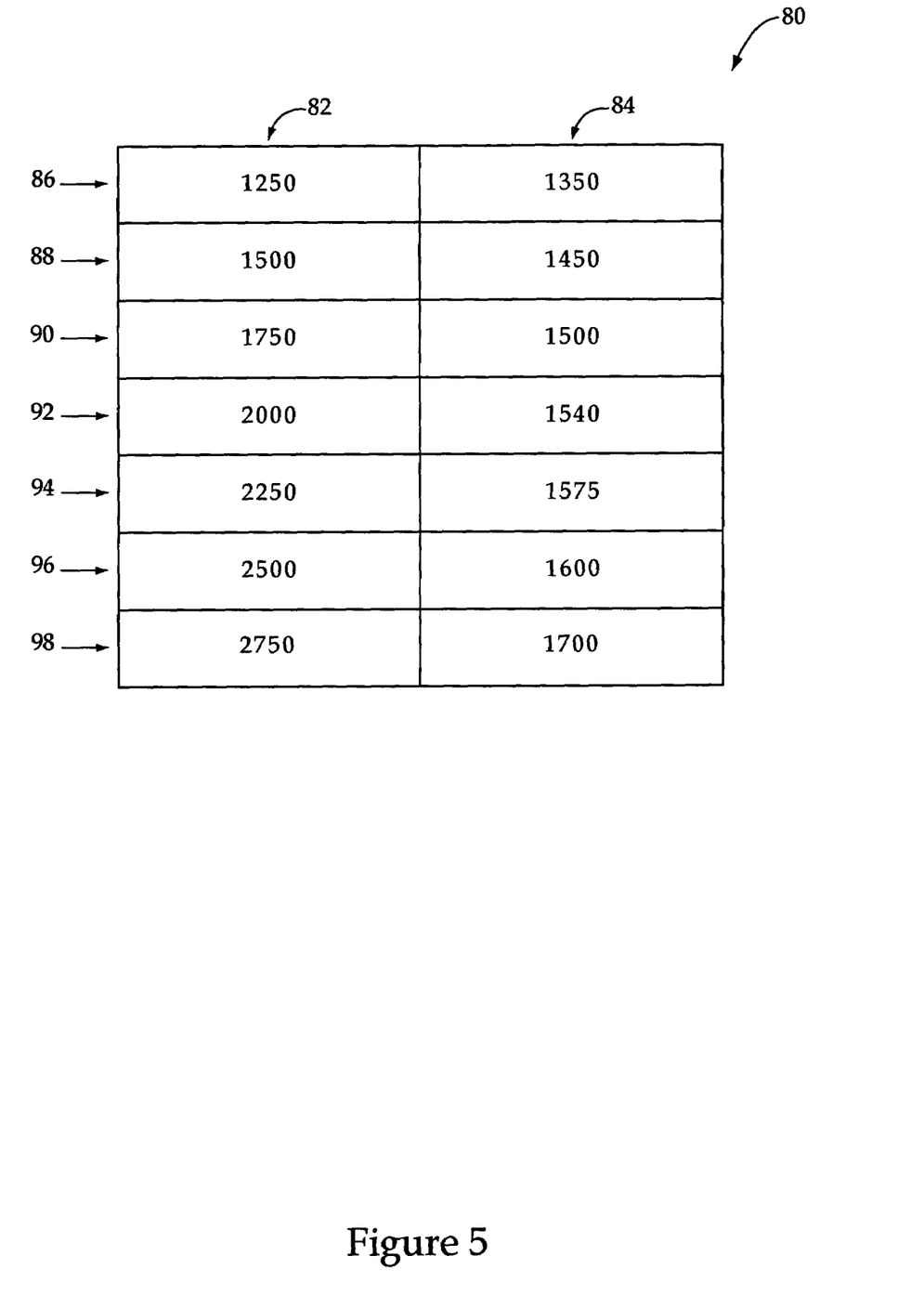
FIG. 5 is a correspondence table that relates lugging horsepower and engine speed across an operating range of the engine according to the present disclosure.

As an example, FIG. 5 illustrates a lug curve correspondence table 80 that may be stored in memory 30. The table 80 relates lugging horsepower, shown in column 82, and engine speed, shown in column 84, wherein all or part of the lugging horsepower values of column 82 were determined by the method of FIG. 3 using the engine speeds listed in column 84. The table 80 may initially contain values representative of the nominal lug curve 66 and may later be replaced or updated as described above by the method of FIG. 3. Rows 86-98 of the table 80 contain lugging horsepower and engine speed values across an operating range of the engine.

INDUSTRIAL APPLICABILITY

The present disclosure finds potential application in any machine that utilizes an electric drive propulsion system that includes an engine coupled to an electric motor via an alternator. Furthermore, the disclosure is specifically applicable to such machines that make some control decisions based upon lug curve data. The machines include, but are not limited to, off-road trucks and other off-road machines, on-road machines, such as buses and trucks, marine vessels, and other machines known in the art.

Referring to FIGS. 1-5, a nominal lug curve 66 is typically provided by a manufacturer of mining truck 10, identifying horsepower values at various engine speeds. While it is desirable to utilize the nominal lug curve 66 to operate the truck 10 at the speed specified for providing the desired horsepower, most engines, due to inherent manufacturing constraints, do not operate according to the nominal curve 66. In addition, natural changes, including normal wear of an engine, may contribute to further changes in the lug curve 66 for a specific engine over time.

Figure 6:
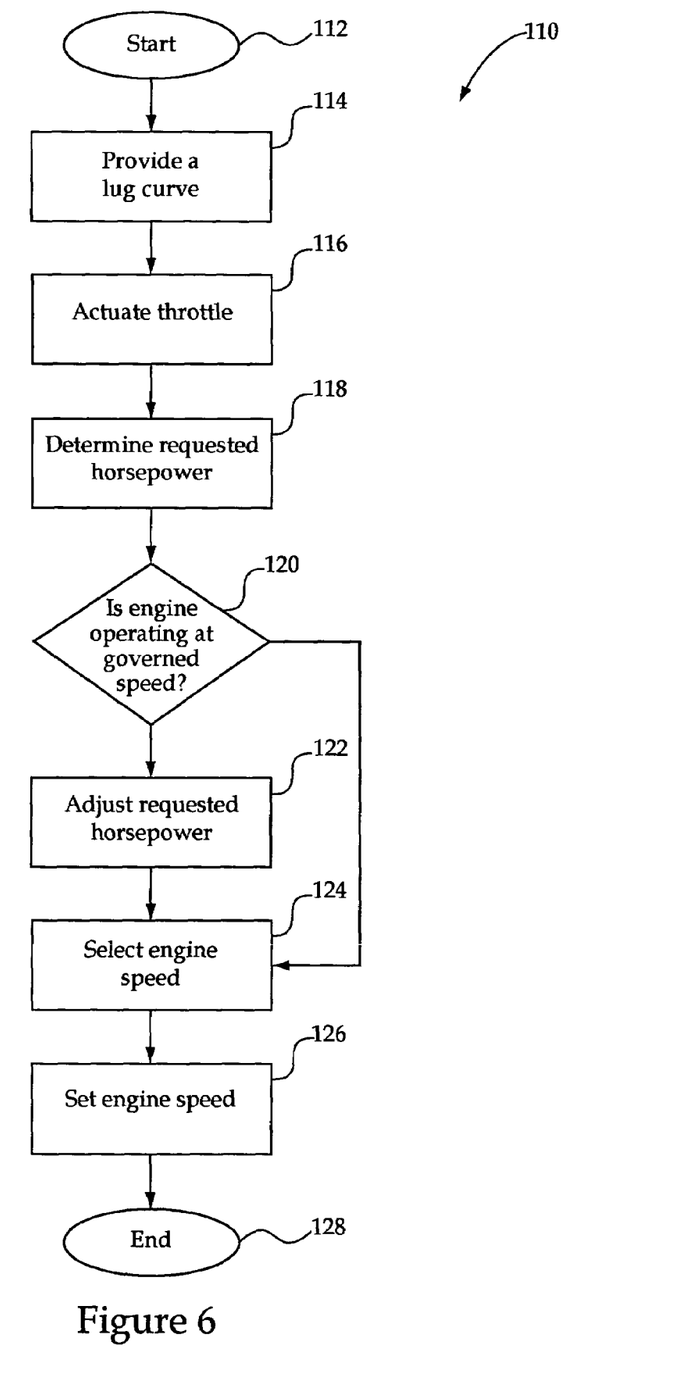
FIG. 6 is a flow chart of one embodiment of a method of operating an engine according to the present disclosure.

Turning to FIG. 6, there is shown a flow chart 110 representing a method of setting the speed of engine 24. The method begins at a START, Box 112. From Box 112, the method may proceed to Box 114, which includes the step of providing a lug curve, such as, for example, lug curve 68, wherein the lug curve is determined by the method of FIG. 3. At Box 116 an operator of mining truck 10 actuates a throttle of the truck, wherein the throttle may be actuated through a range of 0% actuated to 100% actuated. The throttle level is interpreted by the electronic controller 22 at Box 118 as a horsepower demand requested by an operator of the truck 10. For example, an actuation of 0% may represent a request of no horsepower and an actuation of 100% may represent a request of maximum horsepower. An equation stored in memory 30 may be used by the electronic controller 22 to determine the requested horsepower. In one example, the requested horsepower may have a direct linear relationship to the throttle position.

At Box 120, it is determined whether or not the engine 24 is operating at a governed speed. If the engine 24 is not operating at a governed speed, the method jumps to Box 124. If the engine 24 is operating at a governed speed, the method proceeds to Box 122, where an adjustment is made to the requested horsepower. The requested horsepower may, for example, be reduced by a predetermined percentage. Although the condition detected in the illustrated embodiment is governed speed, it may be desirable to sense an alternative condition and adjust the requested horsepower based on that condition.

At box 124 the requested horsepower determined at Box 118 or the adjusted horsepower determined at Box 122 is used to select an engine speed from memory 30. More specifically, an engine speed may be selected from column 84 of correspondence table 80, wherein the lugging horsepower of column 82 is equivalent to the requested horsepower. There may also be an appropriate interpolation algorithm for calculating values between data points of the table 80. At Box 126, the engine 24 is set to operate at the selected engine speed. The method then proceeds to an END, box 128.

The present disclosure is advantageous because it provides a method (FIG. 3) of updating the nominal lug curve 66 of engine 24 to an actual and current lug curve 68, wherein the lug curve can be utilized to operate the engine 24 at the lowest engine speed required to produce the horsepower desired from the operator, as illustrated in the method of FIG. 6. This allows the engine to save fuel that may be wasted when allowing the engine to lug and, further, when continually altering the horsepower from the horsepower value provided by the nominal lug curve. In addition, transient wastage of fuel is avoided by making accurate control decisions with accurate data, rather than relying upon some closed loop algorithm to compensate for inaccurate lug curve data.

It should be understood that the above description is intended for illustrative purposes only, and is not intended to limit the scope of the present invention in any way. Thus, those skilled in the art will appreciate that other aspects of the invention can be obtained from a study of the drawings, the disclosure and the appended claims.

What is claimed is:

1. A machine, comprising:
an electric drive propulsion system comprising an internal combustion engine, an alternator, a motor controller, and at least one electric motor;
an electronic controller in communication with the electric drive propulsion system, the electronic controller configured to determine, in chassis, lugging horsepower of the engine at a plurality of different engine speeds; and
a memory for storing the lugging horsepower for each of the plurality of different engine speeds corresponding to lug curve data, wherein the electronic controller is further configured to affect a control decision based on the lug curve data.

2. The machine of claim 1, further including:
a chassis; and
a dump body pivotally mounted on the chassis, the dump body being movable between a hauling position and a dumping position.

3. The machine of claim 1, wherein the internal combustion engine is a compression ignition engine.

4. The machine of claim 1, wherein the memory includes a correspondence table that maps the lugging horsepower to an engine speed across an operating range of the engine.

5. The machine of claim 4, including a computer read/write device, wherein the computer read/write device is configured to populate the correspondence table.

6. The machine of claim 5, wherein the electronic controller is further configured to operate the engine at an engine speed selected from the memory, wherein the engine speed corresponds to an engine speed of a lug curve correspondence table.

7. The machine of claim 1, wherein the electronic controller is further configured to determine the lugging horsepower of the engine when predetermined conditions are satisfied, including the machine being stationary.

8. The machine of claim 7, including a braking grid, wherein the electronic controller is further configured to determine the lugging horsepower by actuating the alternator and the braking grid until the engine lugs at a selected speed.

9. The machine of claim 7, wherein the electronic controller is further configured to determine the lugging horsepower by increasing the load on the engine with the at least one electric motor until the engine lugs at a selected speed.

10. A method of operating a machine with an electric drive propulsion system having an internal combustion engine, an alternator, a motor controller, and at least one electric motor, the method comprising:
    determining a lugging horsepower of the engine at a plurality of different engine speeds;
    storing the lugging horsepower for each of the plurality of different engine speeds in a memory corresponding to lug curve data; and
    affecting a control decision based on the lug curve data.

11. The method of claim 10, wherein the determining step includes:
    setting a selected speed of the engine;
    increasing a load on the electric drive propulsion system until the engine lugs; and
    setting the lugging horsepower to a value corresponding to the electric drive propulsion system load.

12. The method of claim 10, wherein the determining step is undertaken while the machine is in motion.

13. The method of claim 10, further including:
    operating the engine at an engine speed selected from the memory, wherein the engine speed corresponds to an engine speed of a lug curve correspondence table.

14. The method of claim 10, wherein the operating step includes:
    determining a desired horsepower; and
    overriding the desired horsepower when predetermined conditions are satisfied, including approaching a governed speed of the machine.

15. The method of claim 10, wherein the storing step includes:
    populating a lug curve correspondence table with the lugging horsepower, wherein the table maps the lugging horsepower to an engine speed.

16. The method of claim 10, wherein the determining step is undertaken when predetermined conditions are satisfied, including the machine being stationary.

17. The method of claim 16, further including:
    disabling at least one parasitic load device that draws power from the engine during the increasing step.

18. The method of claim 16, wherein the increasing step includes:
    actuating a braking grid within the electric drive propulsion system.

19. The method of claim 16, wherein the increasing step includes:
    increasing a load on the electric drive propulsion system with the at least one electric motor.

* * * * *